United States Patent
Bourgeois

(10) Patent No.: US 9,366,595 B2
(45) Date of Patent: Jun. 14, 2016

(54) FLUID LEAKAGE DETECTION SYSTEM

(75) Inventor: Pierre Bourgeois, Ohain (BE)

(73) Assignee: Clevergas Holding S.A., Waterloo (BE)

( * ) Notice: Subject to any disclaimer, the term of this patent is extended or adjusted under 35 U.S.C. 154(b) by 295 days.

(21) Appl. No.: 13/980,142

(22) PCT Filed: Jan. 11, 2012

(86) PCT No.: PCT/EP2012/050383
§ 371 (c)(1),
(2), (4) Date: Jul. 17, 2013

(87) PCT Pub. No.: WO2012/098038
PCT Pub. Date: Jul. 26, 2012

(65) Prior Publication Data
US 2013/0291974 A1    Nov. 7, 2013

(30) Foreign Application Priority Data
Jan. 17, 2011 (EP) .................................... 11151135

(51) Int. Cl.
*G01M 3/28* (2006.01)
*F17D 5/02* (2006.01)

(52) U.S. Cl.
CPC . *G01M 3/28* (2013.01); *F17D 5/02* (2013.01); *G01M 3/2807* (2013.01); *Y10T 137/2562* (2015.04); *Y10T 137/7761* (2015.04);
(Continued)

(58) Field of Classification Search
CPC ......... F17D 5/02; G01M 3/28; G01M 3/2807; Y10T 137/7761; Y10T 137/86734; Y10T 137/2562; Y10T 137/87877
USPC ........................................ 137/487.5, 883, 110
See application file for complete search history.

(56) References Cited

U.S. PATENT DOCUMENTS

| 3,722,520 A | * | 3/1973 | Gledhill | .................... F17D 5/02 137/1 |
| 4,019,526 A | * | 4/1977 | Zoppi | .................... B60T 11/326 137/110 |
| 4,355,654 A | * | 10/1982 | Levesque | ............ G01M 3/2815 137/110 |

(Continued)

FOREIGN PATENT DOCUMENTS

| DE | 3833127 A1 | 4/1990 |
| DE | 19501044 A1 | 7/1996 |

(Continued)

OTHER PUBLICATIONS

European Patent Office, International Search Report in International Patent Application No. PCT/EP2012/050383 (Apr. 24, 2012).
(Continued)

*Primary Examiner* — William McCalister
(74) *Attorney, Agent, or Firm* — Leydig, Voit & Mayer LTD

(57) ABSTRACT

Fluid-leakage detection system (14) for a domestic fluid distribution installation (1), comprising: a main fluid feed pipe (9) connected to at least one item of fluid consuming equipment (13) through a corresponding secondary pipe (11), a cutoff valve (15) for cutting off the main feed pipe (9) in the event of the detection of any leak, a small-leak detection device (16) activated in the case of zero global consumption, a flow meter (25) on the secondary pipe of each item of consuming equipment (13) for establishing the state of the global consumption.

13 Claims, 3 Drawing Sheets

(52) U.S. Cl.
CPC .. *Y10T137/86734* (2015.04); *Y10T 137/87877* (2015.04)

(56) References Cited

U.S. PATENT DOCUMENTS

| | | | |
|---|---|---|---|
| 5,269,171 A | | 12/1993 | Boyer |
| 5,503,175 A | * | 4/1996 | Ravilious et al. ............... 137/1 |
| 5,637,789 A | * | 6/1997 | Lawson ................... 73/40.5 R |
| 5,866,803 A | | 2/1999 | Namba et al. |
| 5,979,493 A | * | 11/1999 | Simpkins, Jr. ............ 137/487.5 |
| 6,457,483 B1 | * | 10/2002 | Uhrig ........................ 137/15.11 |
| 6,708,722 B1 | * | 3/2004 | Goodenough ............ 137/487.5 |
| 9,010,360 B1 | * | 4/2015 | Older et al. .................. 137/486 |
| 2006/0009928 A1 | | 1/2006 | Addink et al. |
| 2009/0007968 A1 | | 1/2009 | Knecht et al. |
| 2010/0212748 A1 | | 8/2010 | Davidoff |

FOREIGN PATENT DOCUMENTS

| | | |
|---|---|---|
| EP | 2105715 A1 | 9/2009 |
| GB | 2231697 A | 11/1990 |
| JP | 56-138232 A | 10/1981 |
| JP | 61-148339 A | 7/1986 |
| JP | 06-265437 | 9/1994 |
| JP | 08-043247 | 2/1996 |
| JP | 2002-116076 | 4/2002 |
| JP | 2003-149075 | 5/2003 |
| JP | 2004-138627 | 5/2004 |
| WO | WO 2006/133892 A1 | 12/2006 |

OTHER PUBLICATIONS

Office Action, Sep. 16, 2015, 3 pp., Japanese Patent Office, Japan.

* cited by examiner

FLUID LEAKAGE DETECTION SYSTEM

CROSS-REFERENCE TO RELATED APPLICATIONS

This patent application is the U.S. national phase of International Application No. PCT/EP2012/050383, filed on Jan. 11, 2012, which claims the benefit of European Patent Application No. 11151135.8, filed Jan. 17, 2011, the disclosures of which are incorporated by reference.

FIELD OF THE INVENTION

The invention relates to a fluid leakage detection system for a domestic fluid distribution installation.

INTRODUCTION

Detecting fluid leaks as soon as possible makes it possible to limit the human, material and financial losses that may result therefrom to the maximum possible extent.

This problem is particularly sensitive in the case of combustible gas, the accumulation of which in a closed space increases the risk of explosion. In order to reassure domestic consumers, gas distribution companies seek to equip domestic installations with gas leakage detection systems that are at the same time simple, economical, reliable, rapid and efficacious, which moreover stimulates the consumption of gas in the population and makes their equipment more profitable.

PRIOR ART

Various fluid leakage detection systems are known in the prior art.

In the field of gas detection for example, there exists portable or fixed "sniffer" analysing apparatus. The first have the drawback of requiring a human presence. The second are disadvantageous since they may be situated remote from the leak and therefore react late, or even never react, which gives the user a false impression of safety.

Other fluid leakage detection systems are based in particular on the detection of a leakage rate.

Systems for detecting a leakage rate may function by establishing, via a management means, the difference between the fluid feed rate and the flows consumed. Examples of such systems are set out in the document DE 195 01 044, DE 38 33 127 and U.S. Pat. No. 5,866,803. These systems do not however permit the detection of "small" leaks since the corresponding flow meters do not have the necessary sensitivity.

Other leakage rate detection systems, such as the one disclosed in US 2006/0009928, are based on the detection of a consumption rate abnormality. For the same reason, these systems are also not able to detect "small" leaks.

Yet other systems for detecting a leakage rate function in the case of the absence of consumption of the fluid. Examples of these systems are given below.

The document U.S. Pat. No. 5,269,171 concerns an apparatus for detecting the leakage of a gas, which may be propane or natural gas. When the technician wishes to make a gas leakage test on a gas distribution system, he first of all closes the supply valve and then connects a flow meter by means of hoses on either side of this valve. The gas can then flow by bypassing the latter. This is therefore a check requiring human intervention.

The following four documents concern automatic leakage detection systems.

GB 2231697 relates to a device for detecting the leakage of a fluid, in particular water, mounted in a vertical pipe. In the event of absence of consumption, this pipe is closed off by gravitation by means of a main valve. The fluidtightness of the distribution system can then be checked by enabling the water to flow, in the case of leakage, through a second valve placed so as to bypass the first. Where the leak persists beyond predetermined period, a cutoff valve is activated.

JP 61148339 discloses a device for detecting leakage in a compressed air distribution system intended to supply a pneumatic valve. When the latter is not activated, an isolation valve placed on the main supply pipe is closed periodically so as to enable the compressed air to flow through a flow meter placed so as to bypass the main supply pipe.

JP 56138232 concerns a means of checking fluid leakage remotely. A three-way valve supplies, in one of the configurations thereof, a main pipe leading to a consumer. When the latter is not consuming, the valve goes into another configuration enabling the fluid to pass through a magnetic leakage detector able to send a signal to a control circuit. The latter cuts off the valve in the event of the detection of a leak.

WO 2006 1338892, which can be considered to be close to the invention, relates to a system for detecting a "small" leakage of natural gas functioning in the absence of any consumption. Any "small" leak is detected by diverting the gas, through a three-way valve, to an ultrasensitive flow rate sensor mounted as a bypass with respect to the main pipe. The periods of absence of consumption are predetermined and are obtained either during the night, or by cutting off all the consuming equipment, which is detrimental to the comfort of the user. This system therefore does not provide any means for determining the random absence of consumption, which is detrimental to the safety of the installation and thus to the efficiency of the detection system.

SUMMARY OF THE INVENTION

One aim of the invention is to procure, for a domestic fluid distribution installation, an automatic system for detecting fluid leakage suitable for detecting, at any time, any type of fluid leakage reliably and to react with a short response time.

Another aim is not to interfere with the functioning of the consuming equipment.

To this end, the fluid leakage detection system according to the invention comprises a main fluid feed pipe connected to at least one item of fluid consuming equipment through a corresponding secondary pipe and a control means able to generate a signal in the event of the detection of a leak. A cutoff valve cuts off the main fluid feed pipe. A small-leakage detection device comprises a flow-rate detector able to detect small leaks of fluid and to send a corresponding signal to the control means, mounted in a bypass pipe connected to the main feed pipe, on either side of a bypass valve situated on the main feed pipe. The bypass valve is controlled by the control means and comprises an open position allowing passage through the main fluid pipe to at least one item of consuming equipment, and a closed position diverting the fluid to the bypass pipe through the small-leakage detector, in the event of zero global consumption of the consuming equipment. A management means is able to establish the state of the global consumption. A flow meter able to send a flow rate signal to the management means is placed on the secondary pipe of each item of consuming equipment.

The advantage of the invention is that the detection system is able to establish at all times the global consumption state and to react rapidly according to the latter by virtue of the automatic devices (flow meters, control and management means, bypass valve) in order if necessary to initiate, without having to cut off any consuming equipment, a small-leakage detection and next, in the event of leakage, to send a signal.

In the following description, leaks at a low rate (which occur typically at defective or badly tightened joints, etc), which will be referred to as a "small leak", will be distinguished. To give an idea, a fluid leak is considered in the present application to be a "small leak" if it has an order of magnitude of 1 to 50 liters/hour. "Large leaks" will also be distinguished, typically arising when there is total or partial rupture of a pipe and having an order of magnitude of 50 to 6000 liters/hour.

The flow meter of each item of consuming equipment is advantageously situated in the immediate vicinity of this equipment, in particular in order to avoid a leak in a section of secondary pipe lying between the flow meter and the corresponding equipment being interpreted by the system as "normal" consumption.

The leakage detection system according to the invention preferably also comprises a large-leak detection system. The latter comprises for example a flow meter on the main fluid feed pipe able to send a global feed rate signal to the management means, said management means establishing the existence of a large leak when the difference between the sum of the flow rates consumed and the global feed rate exceeds a predetermined value. In a variant or in addition, the large-leak detection system comprises at least one pressure sensor able to send a pressure signal to the management means. The latter is able to compare the pressure and flow rate measurements with pre-stored reference curves and to establish the existence of a large leak when at least one operating point of the installation deviates significantly from said reference curves.

The at least one pressure sensor is advantageously situated on the main feed pipe and/or on each secondary pipe, a distribution of these sensors over the whole of the domestic installation particularly assisting the reaction speed of the fluid leakage detection system independently of the position of the leak. The at least one pressure sensor may be situated more particularly close to each item of consuming equipment so that a large leak at this point is detected very rapidly.

According to another preferred embodiment, the management means is able to compare the flow consumed by each item of consuming equipment with a pre-stored characteristic consumption curve and to establish the existence of abnormal consumption when at least one of these flows significantly exceeds the corresponding value on the pre-stored characteristic consumption curve.

Advantageously, the management means is able to correlate the measurements of the various items of apparatus with a view to detecting a calibration abnormality and to remedy it. In other words, when the bypass valve is in its closed position and the small-leak flow detector shows the absence of small leaks, the control means can perform the calibration of the zero consumption of each consumer flow meter in order to guarantee and maintain all the time a sufficient flow meter sensitivity to measure this zero consumption. When the bypass valve is in its open position, no fluid flows through the small-leak detector (all the fluid passes through the bypass valve). The control means can then perform a calibration of the small-leak detector with respect to the zero and thus maintain all the time the excellent sensitivity of this detector.

The control means is preferably able to send an alarm signal or a signal for closing the cutoff valve in the event of detection both of a small leak and of a large leak. Preferentially, the alarm signal is duplicated by this closure signal for reasons of comfort and safety.

The leak detection system according to the invention can be used in the case of fluids such as a combustible gas including natural gas, a non-combustible gas, etc.

BRIEF DESCRIPTION OF THE FIGURES

These aspects as well as other aspects of the invention will be clarified in the detailed description of particular embodiments of the invention, reference being made to the accompanying figures, in which.

Generally, similar elements are denoted by identical references in the figures.

DETAILED DESCRIPTION OF A PARTICULAR EMBODIMENT

Figure 1:
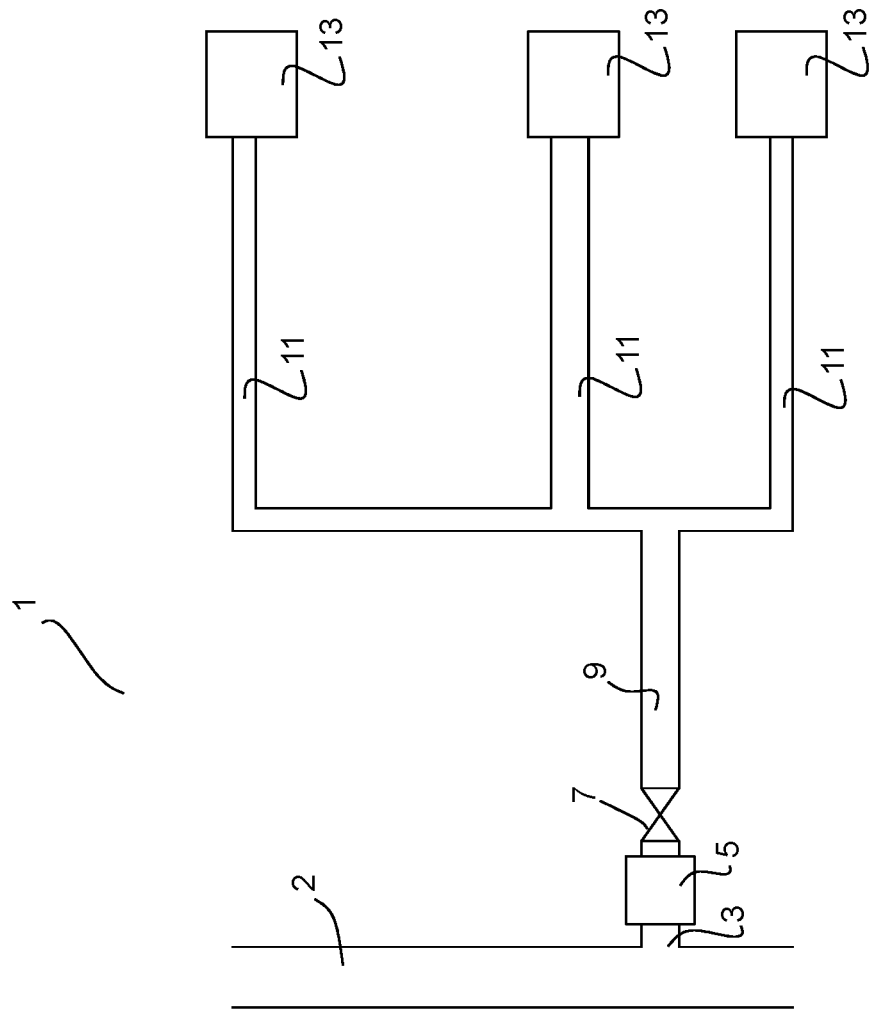
FIG. 1 is a schematic view of a typical domestic installation according to the prior art.

FIG. 1 shows a typical combustible gas distribution installation 1. The gas is brought by a public pipe 2 to a domestic branch 3. A meter 5 meters the consumption at the start of the domestic branch 3. This meter is followed by a manual main valve 7 controlling the opening the domestic installation 1. A domestic distribution system comprises a main pipe 9 emerging on a plurality of secondary pipes 11 intended each to supply an item of consuming equipment 13.

Each item of consuming equipment 13 obviously does not function continuously but has an operating cycle $T_{cycle}$ such that $T_{cycle}=T_{on}+T_{off}$, $T_{on}$ and $T_{off}$ signifying respectively a period of functioning and a period of non-functioning of the equipment 13. This cycle is generally appreciably less than 24 hours and varies in particular according to the external temperature. Each cycle is independent of the others since there is no correlation between them.

In addition, it is possible to obtain several periods during a day (24 hours) during which all the consuming equipment 13 is not consuming any gas, these periods being referred to as OFF periods. This possibility is realistic if consuming equipment 13 such as a general boiler, a water heater without a pilot (which is beneficial for the environment), a cooker, a decorative open fire, etc is considered.

Moreover, the name ON periods is given to periods during which at least one item of consuming equipment 13 is functioning.

Figure 2:
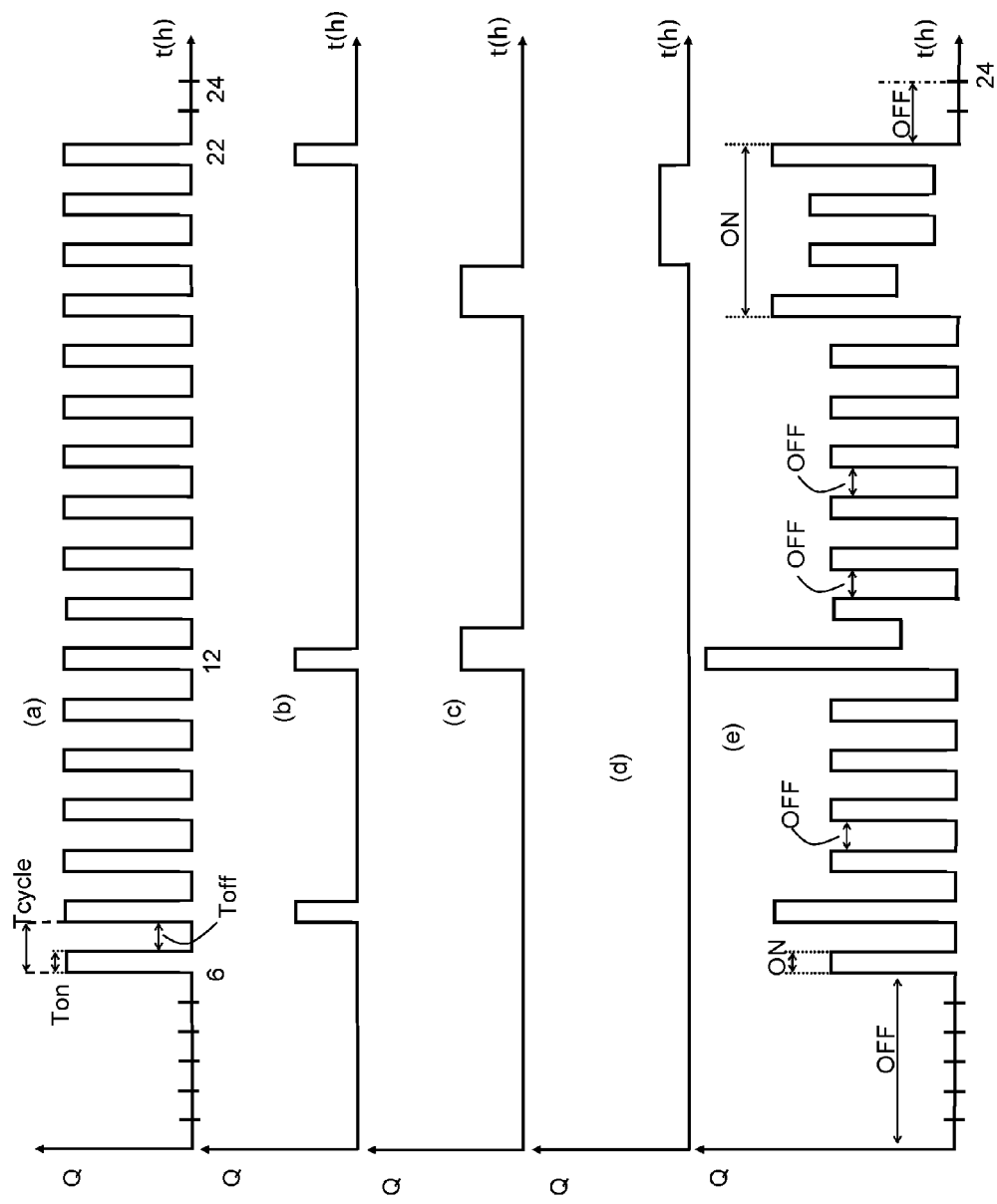
FIG. 2 is an example of individual and global consumption diagrams for typical domestic equipment.

Examples of functioning cycles are set out in FIG. 2, in which the graphs (a), (b), (c) and (d) illustrate respectively the gas consumption Q of the aforementioned boiler, water heater, cooker and open fire. The graph (e) shows the flow consumed by all these items of equipment. Thus, for example: the boiler has a fairly regular cycle of a few tens of minutes with an operating period representing only a percentage of this cycle, a percentage that may vary between 0 and a value significantly less than 100%; the water heater functions several times per day from a few minutes to a few tens of minutes; the cooker functions at the time of the preparation of meals twice to three times per day, from a few minutes to a few hours according to the type of dish being prepared; the open fire functions for a few hours per day.

Consequently it is clear that, for the domestic installation 1, the OFF periods where all the consuming equipment 13 is stopped occurs several times a day, distributed irregularly over time.

It should be noted that the invention can be used for detecting leaks both in a single household and for an apartment building, etc. Consequently, "consuming equipment" can be understood in the present application not only as a particular apparatus such as a boiler but also as all the domestic equipment in an apartment.

Figure 3:
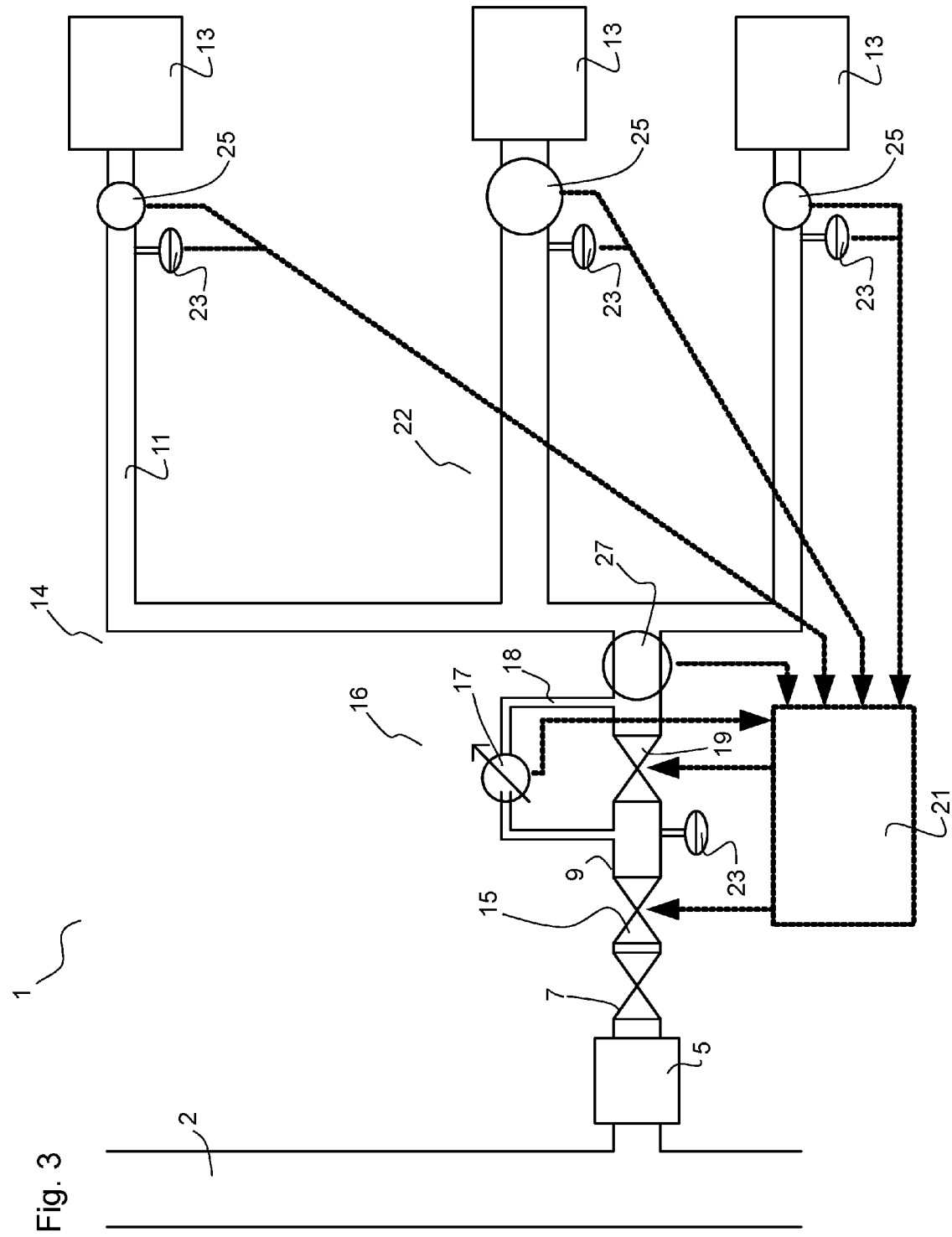
FIG. 3 is a schematic view of an embodiment of the leak detection system according to the invention.

A leak detection system 14, integrated in the installation in FIG. 1, is illustrated in FIG. 3. It comprises: an automatic cutoff valve 15 (distinct from the valve 7); a small-leak detection device 16 comprising a flow detector 17, a bypass pipe 18 and a bypass valve 19; a large-leak detection device 22 comprising pressure sensors 23 and a global flow meter 27; control and management means 21, flow meters 25 upstream of each item of consuming equipment 13.

The gas leakage detection system 14, placed as close as possible to the meter, is designed to detect any leakage of gas, small or large, in a domestic installation 1, practically from the meter 5 as far as the consuming equipment 13. When a leak is detected, a signal is sent to the control means 21, which, where necessary, cuts off the distribution of the gas to all the consuming equipment 13 by activating the closure of the cutoff valve 15.

The small-leak detection device 16 functions on the basis of a flow rate measurement in the bypass (zero flow=no leak, non-zero flow=small leak) by the flow detector 17. The latter is placed on the bypass pipe 18 in order not to interfere with the distribution of gas when at least one item of equipment 13 is consuming. This flow (zero or non-zero) is measured when all the consumers are off. As each item of consuming equipment follows a consumption cycle broken down into two types of period (see above) the apparatus detects (curve e in FIG. 2) the common off periods, during which all the consuming equipment 13 is simultaneously off.

The large-leak detection device 22 on the other hand functions according to a dual mode (pressure and flow measurements). For this purpose, the flows are measured by the equipment 25 and 27. The device 22 also comprises pressure sensors 23, provided at the ends of the installation 1. These flow and pressure measurements make it possible to detect rapidly (an interval of around a few seconds) a large leak independently of the ON/OFF cycle of all the consuming equipment 13. This detection is based on the verification of the consistency between the flows and pressures at the various measuring points.

The control and management means 21 (generally electronic, because of the reaction speed thereof) provide respectively the control and management of the whole of the system 14, by coordinating these various components of the system 14 (sensors 23, valves 15 and 19, flow meters 25 and 27, etc) from an electrical, timing, synchronisation, decision taking and if necessary cutoff point of view.

The detail of the detection of a small leak is described in more detail below. When the detection system 14 measures the small leak, by definition all the consuming equipment 13 is off and the global consumption thereof is therefore zero. The bypass valve 19 is then switched to the closed position, which diverts the gas to the bypass pipe 18, on which the small-leak detector is mounted. The small-leak detector 17 is therefore able to detect the flow rate of any leak continuously and, as long as there is no leak or the leak is below the sensitivity threshold of the sensor, the detector 17 activates nothing and continues to measure. As soon as a (small) leak appears, the detector 17 detects it through a flow rate measurement. It activates an alarm immediately. It can also, in a variant or in addition, actuate the cutoff valve 15 in order to interrupt the distribution. The leakage detector 17 makes it possible to measure very low flow rates, corresponding to leaks that would have passed unnoticed through a conventional system. This detector 17 of course therefore benefits from a significantly higher sensitivity than flow meters measuring a consumption such as the meter 5 or the flow meters 25 situated close to the consuming equipment 13.

Starting any of the items of consuming equipment 13 automatically interrupts the measurement. The moment of this starting up is in fact neither predictable nor synchronised in any way with the detection system 14. Nevertheless, by virtue of the flow meters 25 placed close to the consuming equipment 13, the detection system 14 is warned of this restarting of the consumption and immediately opens the bypass valve 19, enabling gas to pass through the main pipe 9, the cross section of which is compatible with a high consumption rate. The reaction time of the detection system must obviously be compatible with the constraints of the consuming equipment 13 with regard to the startup conditions of the latter, in particular from the point of view of the pressure drop in the pipes 9 and 11. Simultaneously with the opening of the bypass valve 19, the measurement of the leakage by the leak detector 17 is inactive, as long as at least one item of consuming equipment 13 is functioning, and resumes only when a new non-consumption period (OFF period) presents itself.

The non-consumption period is detected by the measurement of the flow consumed by each item of equipment 13 via the flow meters 25. The flow meter 25 is chosen so as to have a sensitivity compatible with the minimum flow rate of the corresponding equipment 13, while enabling gas to pass into the latter when it is at its maximum flow rate. It must also cause a negligible pressure drop.

When the "total absence of consumption" condition is once again fulfilled, a new small-leak measuring cycle can restart and the leak detection system 14 closes the bypass valve 19.

Moreover, as the small-leak detection is activated by a signal noting a total absence of consumption, this should be established rigorously. For this purpose, the management means 21 is chosen so as to distinguish (discriminate) unambiguously, for each item of consuming equipment 13, an absence of consumption (=zero consumption) from its minimum consumption, despite possible measuring errors caused by the corresponding flow meter 25. In the case for example of a cooker having a minimum consumption of around 50 liters/hour, the management means 21 must be able to unambiguously distinguish this minimum consumption from its zero consumption, having regard in particular to a possible error of offset of the real zero of the flow meter 25 of around 10 liters/hour. The management means 21 is, in order to establish the zero consumption of the cooker, based on a discrimination threshold that will lie between 50 liters/hour and 10 liters/hour, for example 30 liters/hour, the "median" value making it possible to preserve a margin of error due to the measuring noise and other uncertainties. Any value measured on the flow meter 25 of less than 30 liters/hour would then be interpreted by the management means 21 as an absence of consumption by the cooker.

Regular correction of the offset error during a recalibration in a small-leak measuring period makes it possible to limit the drift in time (over several months, or even several years) of this error and therefore to preserve a discrimination threshold that is acceptable with respect to the margins fixed at the start of the commissioning of the flow meter 25. This is because, if the small-leak detector 17 indicates that there is no leak, an adjustment of the zero level of the flow meters 25 may be applied.

Moreover, when the bypass valve 18 is open to enable the consuming equipment 13 to be supplied with gas, no gas flow passes into the flow rate detector 17 because of its small diameter. Thus a correction of a zero drift of the detector 17 can be made during each ON period, which enables the detector 17 to preserve all its sensitivity permanently.

The detection of large leaks is detailed below.

Functioning according to a dual mode (pressure and flow rate measurements) as shown in FIG. 3, the large-leak detection device 22 increases its reliability and therefore safety since it generates an alarm signal or a signal for cutting off the installation 1 should the pressure measurements be incompatible with the flow rate measurements, thus indicating faulty functioning of the equipment or of the installation. In order to verify such an abnormality, the pressure measurements are correlated at the start of use with the flow rates, these correlations giving rise to a reference pressure profile that is stored and, where necessary, subjected subsequently to a "learning" of the system. The pressure/flow rate measurements make it possible to detect an abnormality in the domestic distribution installation 1 when the corresponding operating point deviates significantly from a reference profile.

In addition, during the small-leak measurements, in a zero consumption period, the pressure drops are almost zero and recalibration of all the pressure sensors 23 can be carried out, the pressure being substantially the same throughout the distribution installation 1.

The sensitivity required for this large-leak detection being significantly lower than for the measurement of small leaks, the detection principle proposed corresponds to this sensitivity level. The aforementioned measurements of flow rates and pressures taking place independently of the operating state of the consuming equipment 13, the large-leak detection device is therefore active continuously. It therefore responds almost instantaneously (typically in a few seconds) to the appearance of a large leak by closing the cutoff valve 15, which puts the installation 1 in a safety mode.

The leak detection system 14 can also detect abnormal consumption, due for example to a large leak at an item of consuming equipment 13 or to a breakdown thereof, by having recourse to characteristic consumption profiles or curves of the various items of consuming equipment 13 previously stored in its management means 21. An excess or lack of consumption predetermined with respect to these curves is interpreted by the management means 21 as an abnormality and gives rise to a warning signal or a signal for cutting off the distribution installation 1.

"Typical" consumption modes of certain items of equipment 13 are outlined below. A boiler functions more in winter than in summer. The winter consumption thereof is fairly regular from one day to another, except in the case of abrupt variations in temperature. Moreover, a cooker generally functions before the meal times and not more than a few hours in a row. A decorative open fire functions in particular in the evenings, etc.

The aforementioned consumption profiles may be the subject of changing learning or be adapted by the user to his consumption habits.

In the case of the detection of abnormal consumption, the control means 21 preferably emits an alarm signal and/or a signal for cutting off the installation 1.

The result of the above is that the gas leak detection system 14 detects a gas leak of any magnitude in a domestic installation practically from the meter as far as the consuming equipment and takes the effective action for making the installation safe within times compatible with the magnitude of the leak.

The leak detection based on two principles makes it possible respectively to detect both small leaks and large leaks in times compatible with these two types of leak.

The detection of large leaks is continuous and independent of the operating state ON/OFF of the consuming equipment. The reaction time therein is therefore very short, which is compatible with the danger relating to large leaks.

On the other hand, the detection of small leaks, requiring a very fine and sensitive measurement of almost zero flow, is performed only during periods allowing such measurement, that is to say during the OFF periods of all the consuming equipment 13. Detection is therefore not continuous. Nevertheless, in the light of the low rate of this type of leak, the reaction time remains compatible with safety standards.

The result of the above is also that no consuming equipment is cut off during the measurement of a leak, whether it be small or large, which is advantageous in terms of comfort.

In addition, as suggested previously, the coexistence of a small-leak detection device 17 and a large-leak detection device 22 produces a synergy between them. If the small-leak detector 17 indicates that there is no leak, an adjustment of the zero level of the flow meters 27 and 25 can be applied, which improves the precision and therefore the reliability of the detection both of small and of large leaks. Moreover, when the large-leak detection device 22 functions alone, that is to say whenever there is consumption, a correction of a zero-drift of the detector 17 may be performed, which enables the detector to keep all its sensitivity and therefore all its reliability continuously.

It will be obvious to a person skilled in the art that the present invention is not limited to the example illustrated and described above. The invention comprises each of the novel features as well as the combination thereof. The presence of reference numbers may not be considered to be limitative. Use of the term "comprises" may in no way exclude elements other than those mentioned. The use of the definite article "a" for introducing an element does not exclude the presence of a plurality of such elements. The present invention has been described in relation to a specific embodiment, which has a purely illustrative value and must not be considered to be limitative.

The invention claimed is:

1. A fluid-leakage detection system for a domestic fluid distribution installation, comprising a main fluid feed pipe connected to at least one item of fluid consuming equipment through a corresponding secondary pipe, a control and management means able to generate a signal in the event of the detection of a leak, a cutoff valve for cutting off the main feed pipe, a small-leak detection device comprising a flow detector able to detect small fluid leaks and to send a corresponding signal to the control and management means, mounted in a bypass pipe connected to the main feed pipe, on either side of a bypass valve situated on the main pipe, the bypass valve being controlled by the control and management means and comprising an open position enabling fluid to pass through the main pipe to at least one item of consuming equipment and a closed position diverting the fluid to the bypass pipe through the small-leak detector, the detection system further including a flow meter on the secondary pipe of each item of consuming equipment, able to send a flow rate signal to the control and management means, which is able to continuously total the flow rate signals received, wherein whenever the global consumption is zero, the control and management means is further configured to put the bypass valve in the closed position and to perform the calibration of the zero consumption of each flow meter if the flow detector shows the absence of small leaks.

2. The detection system according to claim 1, wherein the flow meter is situated upstream of the corresponding consuming equipment.

3. The detection system according to claim 1, further comprising a flow meter on the main fluid feed pipe able to send a global feed rate signal to the control and management means, said control and management means establishing the existence of a large leak when the difference between the sum of the flows consumed and the global feed flow rate exceeds a predetermined value.

4. The detection system according to claim 1, further comprising at least one pressure sensor able to send a pressure signal to the control and management means which is able to compare the pressure and flow rate measurements with pre-stored reference curves and to establish the existence of a large leak when at least one operating point of the installation differs significantly from said reference curves.

5. The detection system according to claim 4, wherein at least one pressure sensor is situated on the main feed pipe.

6. The detection system according to claim 4, wherein at least one pressure sensor is situated on each secondary pipe.

7. The detection system according to claim 6, wherein at least one pressure sensor is also situated close to at least one item of consuming equipment.

8. The detection system according to claim 1, wherein the control and management means is able to compare the flow consumed by each item of consuming equipment with a pre-stored characteristic consumption curve and to establish the existence of abnormal consumption when at least one of these flows is significantly greater or less than the corresponding value of the pre-stored characteristic consumption curve.

9. The detection system according to claim 1, wherein the control and management means is able to send an alarm signal in the event of the detection both of small leaks and of large leaks.

10. The detection system according to claim 1, wherein the control and management means is able to close the cutoff valve in the event of the detection both of small leaks and of large leaks.

11. The detection system according to claim 1, wherein the control and management means is able to correlate the measurements of the various appliances with a view to detecting an abnormality in calibration and to remedy it.

12. The detection system according to claim 1, wherein the fluid is a combustible gas.

13. The detection system according to claim 12, wherein the combustible gas is natural gas.

\* \* \* \* \*